United States Patent [19]

Feder et al.

[11] Patent Number: 4,535,816
[45] Date of Patent: Aug. 20, 1985

[54] PRESSURE CONTROLLER

[75] Inventors: Meinrad Feder, Leonberg; Alwain Stegmaier, Schwieberdingen, both of Fed. Rep. of Germany

[73] Assignee: Robert Bosch GmbH, Stuttgart, Fed. Rep. of Germany

[21] Appl. No.: 513,978

[22] Filed: Jul. 14, 1983

[30] Foreign Application Priority Data

Jul. 21, 1982 [DE] Fed. Rep. of Germany ....... 3227229

[51] Int. Cl.³ ............................................. F16K 31/06
[52] U.S. Cl. .................................. 137/625.65; 251/48; 335/274
[58] Field of Search .................... 251/129, 141, 48; 137/625.65; 335/262, 274

[56] References Cited

U.S. PATENT DOCUMENTS 2,620,824 12/1952 Slomer .............................. 251/48 X
3,831,729 8/1974 Howard ........................... 335/274 X
4,250,922 2/1981 Will ................................ 137/625.65

FOREIGN PATENT DOCUMENTS 461727 6/1925 Fed. Rep. of Germany ........ 251/48
2361591 6/1975 Fed. Rep. of Germany ..................... 137/625.65
2255272 4/1979 Fed. Rep. of Germany .
2039000 7/1980 United Kingdom ........... 137/625.65

Primary Examiner—Robert G. Nilson
Attorney, Agent, or Firm—Michael J. Striker

[57] ABSTRACT

A pressure controller has a magnetic coil and a magnetic armature arranged in a housing, a control piston movable in a distributor housing and actuatable by the armature, and a shaft supporting the armature and having two ends facing towards and away from the control piston, where the end facing away from the control piston is slidingly supported in a bearing bush, and the end facing towards the control piston is held by a membrane spring fixed at its periphery to the first-mentioned housing.

6 Claims, 2 Drawing Figures

PRESSURE CONTROLLER

BACKGROUND OF THE INVENTION

The present invention relates to a pressure controller. More particularly, it relates to a pressure controller which has a magnetic coil and a magnetic armature accommodated in a housing, a control piston movable in a distributor housing and actuatable by the armature, and a shaft which carries the armature and is coaxially supported in its end in axial and radial direction.

Pressure controllers of the above mentioned general type are known in the art. In a known pressure controller for controlling hydraulic pressure and acting as a magnetic valve the magnetic coil deflects the armature which in turn engages with the control piston slidable in the distributor housing so as to release or block the supply and discharge passages. Such a pressure controller is disclosed, for example in the German Auslegeschrift No. 2,255,272.

In the known pressure controllers, the armature is conventionally deflected by a rod which is arranged coaxially to the magnetic coil and supported at its ends. The support is formed in the known pressure controller by ball bearings. This makes possible a high-precision regulation, on the one hand, but requires essential manufacturing and mounting expenses, on the other hand. Moreover, such a ball-bearing supported pressure controller requires an especially expensive sealing, inasmuch as the ball bearing is especially susceptible to dirtying. Finally, in the ball bearing-supported pressure controllers, there is a special danger for axial bearings, in that they can have a one-sided running of the ball cage and, as a result, a short-time sliding friction.

SUMMARY OF THE INVENTION

Accordingly, it is an object of the present invention to provide a pressure controller which operates practically without losing its controlling properties and is characterized by simple manufacture and mounting, and cost reduction, and a low susceptibility to dirtying.

In keeping with these objects and others which will become apparent hereinafter, one feature of the present invention resides, briefly stated, in a pressure controller having a magnetic coil and a magnetic armature arranged in a housing, a control piston movable in a distributor housing and actuatable by the armature, and a shaft supporting the armature and arranged coaxial with the coil wherein a bearing bush slidingly supports the shaft at its end facing away from the control piston, and a diaphragm spring holds the shaft at its end facing toward the control piston and has a periphery fixed in the first-mentioned housing.

When the pressure controller is designed in accordance with the present invention, it attains the above mentioned objects. The inventive pressure controller is especially friction-free, because the used flat spring operates basically without friction. The used flat spring is also wear-free, so that the service life of the inventive pressure controller is especially high. The used flat spring also occupies a smaller space than a ball bearing, so that the inventive pressure controller has a smaller dimension. Finally, the membrane spring does not have to be supported by a hard shaft, whereas in a pressure controller provided with ball bearings an expensive construction is necessary, since the shaft must be non-magnetic and therefore not hardenable.

In accordance with another feature of the present invention, the membrane spring is formed so that it has a weak characteristic. As a result of this, it provides an axial guidance and radial holding of the shaft, whereas a control spring for fixing the maximum pressure to be controlled is formed by a spiral spring with an essentially harder characteristic.

In the inventive pressure controller, the shaft end which faces away from the control piston can be supported in a sliding bearing which provides for further simplification of manufacture and reduction of dimensions of the controller. Since transverse forces take place only at the armature side at the radial air gap and at the working air gap, they are continuously absorbed by the membrane spring and do not act upon the sliding bearing. Thereby, the friction forces and wear of the sliding bearing is very small, since only negligible surface pressure takes place here.

Finally, the shaft can be formed in the region of the sliding bearing as a bearing pin with an unloading groove. Thereby different damping properties of the inventive pressure controller can be carried out with minimal expenses.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
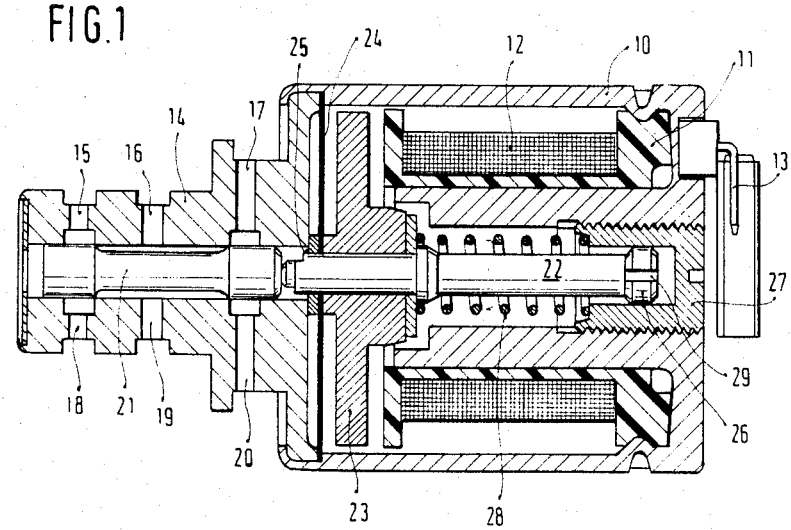
FIG. 1 is a view showing a section of a pressure controller in accordance with the present invention.

A pressure controller in accordance with the present invention has a housing which is identified with reference numeral 10. A coil forming body 11 with a coil 12 and electrical conductors 13 are accommodated with the housing 10.

A distributor housing 14 is formed on the housing 10. Passages 15, 16, 17, 18, 19 and 20 are provided in the distributor housing 14. The passages 15–20 are part of a hydraulic device which is not shown in FIG. 1 and operates to supply and withdraw a hydraulic pressure medium. A control piston 21 movable in the distributor housing 14 serves for adjusting the pressure via the passages 15–20.

A shaft 22 displaces coaxially to the control piston 21 and the coil 12 and carries an armature 23. The shaft 22 at its end facing toward the control piston 21 and in the connecting point of the shaft 22 with the armature 23, is retained by a membrane spring 24. The membrane spring 24 is inserted into the housing 10. In the connecting point of the shaft 22, the armature 23, and the membrane spring 24, a mechanical connection is formed.

The shaft 22, and more particularly its end facing away from the control piston 21, ends in a bearing pin 26 which runs in a bearing bush 27. The bearing bush 27 in turn is held coaxially by the coil forming body 11. The armature 23 supports, via a spring 28, on the bearing bush 27. The bearing pin 26 has an unloading passage 29 through which the volume is unloaded on the bottom of the blind hole of the bearing bush 27.

Figure 2:
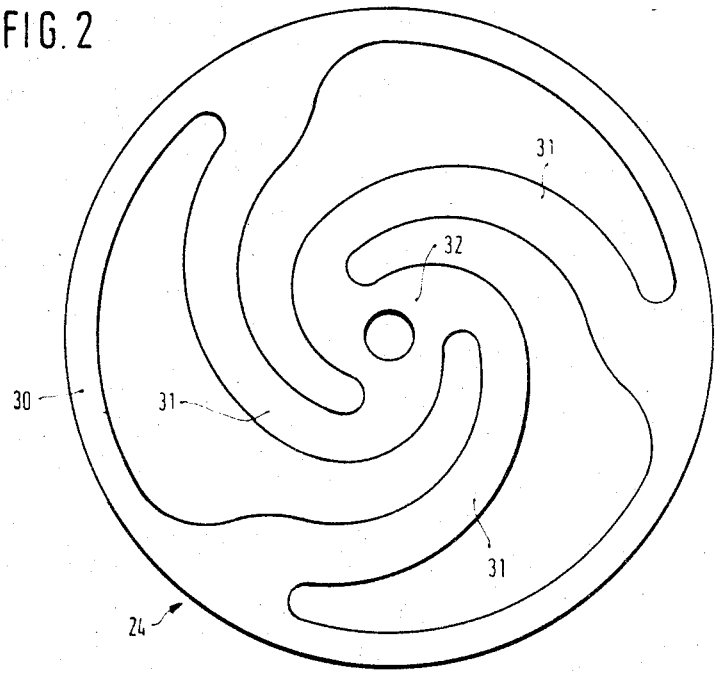
FIG. 2 is a view showing a membrane spring which is used in the pressure controller of the present invention.

The membrane spring 24 is formed in accordance with a preferable feature of the invention as shown in detail in FIG. 2.

The membrane spring is circular, but is only partially formed massively. At its periphery, it has an annular portion 30 which transits into several spiral-shaped arms 31. The spiral-shaped arms 31 lead to a common central portion 32 in which the connecting point identified in FIG. 1 with reference numeral 1 is arranged.

When the coil 12 of the pressure controller is supplied with current, the armature 23 is pulled toward the coil and thereby moves the control piston 21. The transverse force which is produced in the air gap between the armature 23 and the coil 12 is absorbed by the membrane spring 24. A sliding bearing formed by the bearing bush 27 and the bearing pin 26 practically takes no transverse forces. The membrane spring 24 designed as shown in FIG. 2 has a very weak characteristic for this spring, so that the membrane spring 24 applies no spring force during deflection of the armature 23. The spring force is practically exclusively captured by the spring 28, which thereby fixes the maximum pressure to be adjusted.

By dimensioning of the unloading groove 29 in the bearing pin 26, a definite damping ratio of the inventive pressure controller can be adjusted.

The inventive pressure controller is suitable especially for adjusting the pressure in an automatic stepped transmission of a power vehicle. It is to be understood that the application of the inventive pressure controller is not limited to this field, but it can be used in any field where a hydraulic pressure is to be controlled.

It will be understood that each of the elements described above, or two or more together, may also find a useful application in other types of constructions differing from the types described above.

While the invention has been illustrated and described as embodied in a pressure controller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A pressure controller, comprising
   a housing;
   a magnetic coil arranged in said housing;
   a magnetic armature arranged in said housing;
   a distributor housing;
   a control piston movable in said distributor housing and actuatable by said armature;
   a shaft which supports said armature and is arranged coaxial with said coil, said shaft having two ends which respectively face toward and away from said control piston and are axially and radially supported;
   a bearing bush which is arranged to slidingly support said shaft at its end facing away from said control piston; and
   a membrane spring which is arranged to hold said shaft at its end facing toward said control piston and has a periphery held in said first-mentioned housing, so that the ends of said shaft are supported differently with one end of said shaft supported by said bearing bush and the other end of said shaft supported by said membrane spring.

2. A pressure controller as defined in claim 1, wherein said membrane spring has an annular portion formed at its periphery, a central portion in which it is connected with said shaft, and a plurality of spiral-shaped thin arms which lead from said annular peripheral portion to said central portion.

3. A pressure controller as defined in claim 1; and further comprising a spring which supports said armature against said first-mentioned housing and has a characteristic which is harder than that of said membrane spring.

4. A pressure controller as defined in claim 1, wherein said armature is connected with said shaft in a connecting point, said membrane spring holding said shaft at said connecting point of said armature with said shaft.

5. A pressure controller as defined in claim 1, wherein said bearing bush has a blind hole; and further comprising a bearing pin which supports said shaft at said side facing away from said control piston in the region of said blind hole of said bearing bush, said bearing pin having an unloading groove.

6. A pressure controller, comprising
   a housing;
   a magnetic coil arranged in said housing;
   a magnetic armature arranged in said housing;
   a distributor housing;
   a control piston movable in said distributor housing and actuatable by said armature;
   a shaft which supports said armature and is arranged coaxial with said coil, said shaft having two ends which respectively face toward and away from said control piston and are axially and radially supported;
   a bearing bush which is arranged to slidingly support said shaft at its end facing away from said control piston; and
   a membrane spring which is arranged to hold said shaft at its end facing toward said control piston and has a periphery held in said first-mentioned housing, said membrane spring having an annular portion formed at its periphery, a central portion in which it is connected with said shaft, and a plurality of spiral-shaped thin arms which lead from said annular peripheral portion to said central portion; and a spring which supports said armature against said first-mentioned housing and has a characteristic which is harder than that of said membrane spring.

* * * * *